(12) United States Patent
Liao

(10) Patent No.: US 11,040,753 B2
(45) Date of Patent: Jun. 22, 2021

(54) BICYCLE HANDLEBAR DAMPING DEVICE

(71) Applicant: HSIN LUNG ACCESSORIES CO., LTD., Hsin-Chu Hsien (TW)

(72) Inventor: Xue-Sen Liao, Hsin-Chu Hsien (TW)

(73) Assignee: HSIN LUNG ACCESSORIES CO., LTD., Hsin-Chu Hsien (TW)

( * ) Notice: Subject to any disclaimer, the term of this patent is extended or adjusted under 35 U.S.C. 154(b) by 152 days.

(21) Appl. No.: 16/505,791

(22) Filed: Jul. 9, 2019

(65) Prior Publication Data

US 2020/0017161 A1 Jan. 16, 2020

(30) Foreign Application Priority Data

Jul. 13, 2018 (TW) ................................. 107209519

(51) Int. Cl.
*B62K 21/14* (2006.01)
*B62K 21/16* (2006.01)
*B62K 21/22* (2006.01)
*B62K 21/20* (2006.01)
*B62K 21/18* (2006.01)
*B62K 21/02* (2006.01)

(52) U.S. Cl.
CPC .............. *B62K 21/14* (2013.01); *B62K 21/16* (2013.01); *B62K 21/20* (2013.01); *B62K 21/22* (2013.01); *B62K 21/02* (2013.01); *B62K 21/145* (2013.01); *B62K 21/18* (2013.01)

(58) Field of Classification Search
CPC ........ B62K 21/02; B62K 21/12; B62K 21/14; B62K 21/145; B62K 21/16; B62K 21/18; B62K 21/20; B62K 21/22

USPC ........................................................ 74/551.2
See application file for complete search history.

(56) References Cited

U.S. PATENT DOCUMENTS

| 5,511,444 A * | 4/1996 | Clausen ................. B62K 21/14 280/276 |
| 6,192,773 B1 * | 2/2001 | Liao ....................... B62K 21/16 280/279 |
| 2017/0043838 A1 * | 2/2017 | Ahnert ................... B62K 21/14 |

\* cited by examiner

*Primary Examiner* — Minnah L Seoh
*Assistant Examiner* — Hosam Shabara
(74) *Attorney, Agent, or Firm* — Demian K. Jackson; Jackson IPG PLLC

(57) ABSTRACT

The damping device according to the invention includes a pressing member, a shock absorption member and an adjustment member. The shock absorption member is disposed in an accommodation room defined between the pressing member and the handlebar seat. The shock absorption member are arranged in contact with the pressing member and the handlebar seat, so that when a rider is riding a bicycle on an uneven road causing the front fork tube to shake up and down, the invention disclosed herein would absorb the shock force as the pressing member presses against the shock absorbing member. The adjustment member is arranged to extend through the handlebar seat into the pressing member and contact the shock absorption member, so that the strain rate of the damping device can be adjusted by the adjustment member, thereby performing various degrees of shock absorption effects.

12 Claims, 4 Drawing Sheets

BICYCLE HANDLEBAR DAMPING DEVICE

PRIORITY CLAIM

This application claims priority to R.O.C. Utility Model Application No. 107209519 filed Jul. 13, 2018, the entirety of which is incorporated herein by reference.

BACKGROUND OF THE INVENTION

1. Field of the Invention

The present invention generally relates to an improved shock absorption structure that is applicable to a bicycle, and more particularly to a damping device that is capable of damping shock impulses and improving riding comfort.

2. Description of Related Art

Bicycles are a commonly used transportation vehicle. In general, a bicycle handlebar is used to control the direction of travel, and the handle grip is connected to the front fork tube of the bicycle by a stem, so that the bicycle rider can control the rotation of the front fork tube by turning the handlebar, thereby changing the direction of travel of a bicycle.

However, a conventional bicycle stem has only the function of connecting the handlebar and the front fork tube. However, there is rarely a completely flat road. Therefore, when a user rides a bicycle and encounters rugged roads or climbs on a stone road where there are high or low slopes on the road surface, the bicycle will vibrate due to the unevenness of the ground. The vibration on the front wheel is easily transmitted to the handlebar via the front fork tube and the stem. In a less serious situation, such a vibration will affect the rider's comfort in gripping the handlebar. Long time of riding is likely to cause tingling discomfort of two hands. In a more serious situation, it will hamper the rider's handling of the bicycle and affect the safety of the bicycle as it travels.

SUMMARY OF THE INVENTION

In view of this, the present invention provides an improved damping device that is suitable for use in bicycles, and more particularly to a shock absorption structure that is capable of damping shock impulses and improving riding comfort.

The invention is adapted for use with a bicycle, where a handlebar is connected to a front fork tube by a stem tube comprising a stem seat and a handlebar seat. The handlebar seat is provided with a pair of lug clip portions pivoted on a pivot portion of the stem seat by a pivot assembly. The damping device comprises at least one pressing member integrated with and extending from the pivot portion of the stem seat towards the handlebar, wherein an accommodation room is defined between the pressing member and a main body of the handlebar seat; at least one shock absorption member disposed in the accommodation room and arranged in contact with the pressing member and the main body of the handlebar seat; and an adjustment member extending through the main body of the handlebar seat into the pressing member, thereby contacting the shock absorption member.

When a rider is riding a bicycle on an uneven road causing the front fork tube to shake and move up and down, the invention disclosed herein can buffer and absorb the shock force as the pressing portion presses against the shock absorbing member to reduce the discomfort of the hands due to the shaking of the bicycle, thus improving the comfort and safety of bicycle riding. The strain rate of the damping device can be adjusted by the adjustment member, thereby performing various degrees of shock absorption effects.

According to said technical features, the damping device further comprises a gasket disposed between the pressing member and the shock absorption member.

According to said technical features, the pressing member is formed with a through hole through which the adjustment member is inserted.

According to said technical features, the through hole is provided with internal threads, and the adjustment member is provided with external threads for engaging the internal threads.

According to said technical features, the main body of the handlebar seat is formed with a perforation, thereby exposing a head of the adjustment member.

According to said technical features, a pressing member is formed with an annular flange extending towards the perforation, and a shock absorber is sleeved upon the annular flange, so that the shock absorber abuts against the pressing member and the main body of the handlebar seat According to said technical features, a surrounding wall extends from circumference of the pressing member towards the main body of the handlebar seat to surround lateral sides of the shock absorption member.

According to said technical features, the shock absorption member and the shock absorber are made of elastic material, such as plastics, rubbers and so on.

According to said technical features, the pivot assembly comprises a first and a second fastener members engaged with each other, each of them being formed at its outer end with a cover plate configured to be complementary in shape with one of the lug clip portions, and wherein the first fastener member is formed with a bolt hole extending throughout an entire length of the first fastener member and adapted to receive the second fastener member, and an adjustment part is screwed into the bolt hole through the cover plate of the first fastener member.

According to said technical features, the pivot assembly further comprises two gaskets fitted between the lug clip portions and the pivot portion and sleeved upon the first fastener member.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE INVENTION

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
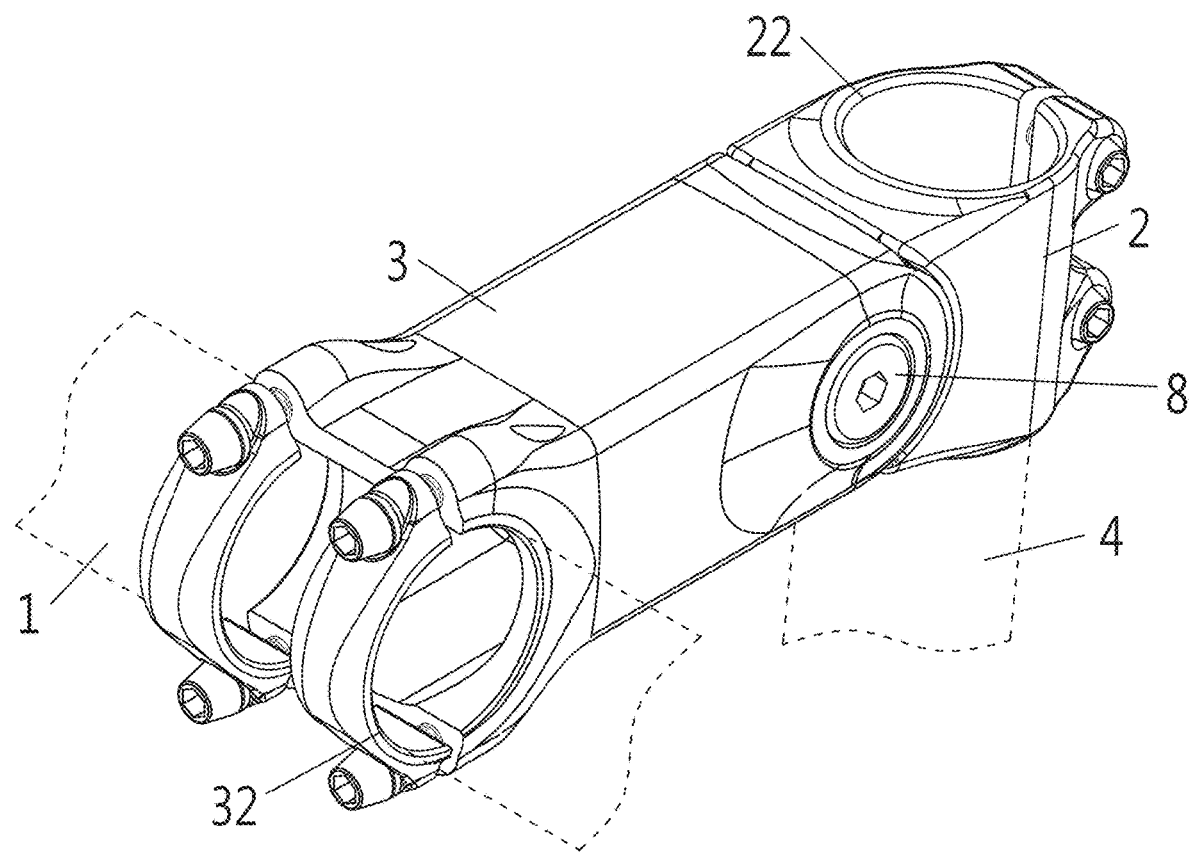
FIG. 1 is a perspective structural diagram of the damping device according to the invention.
Figure 2:
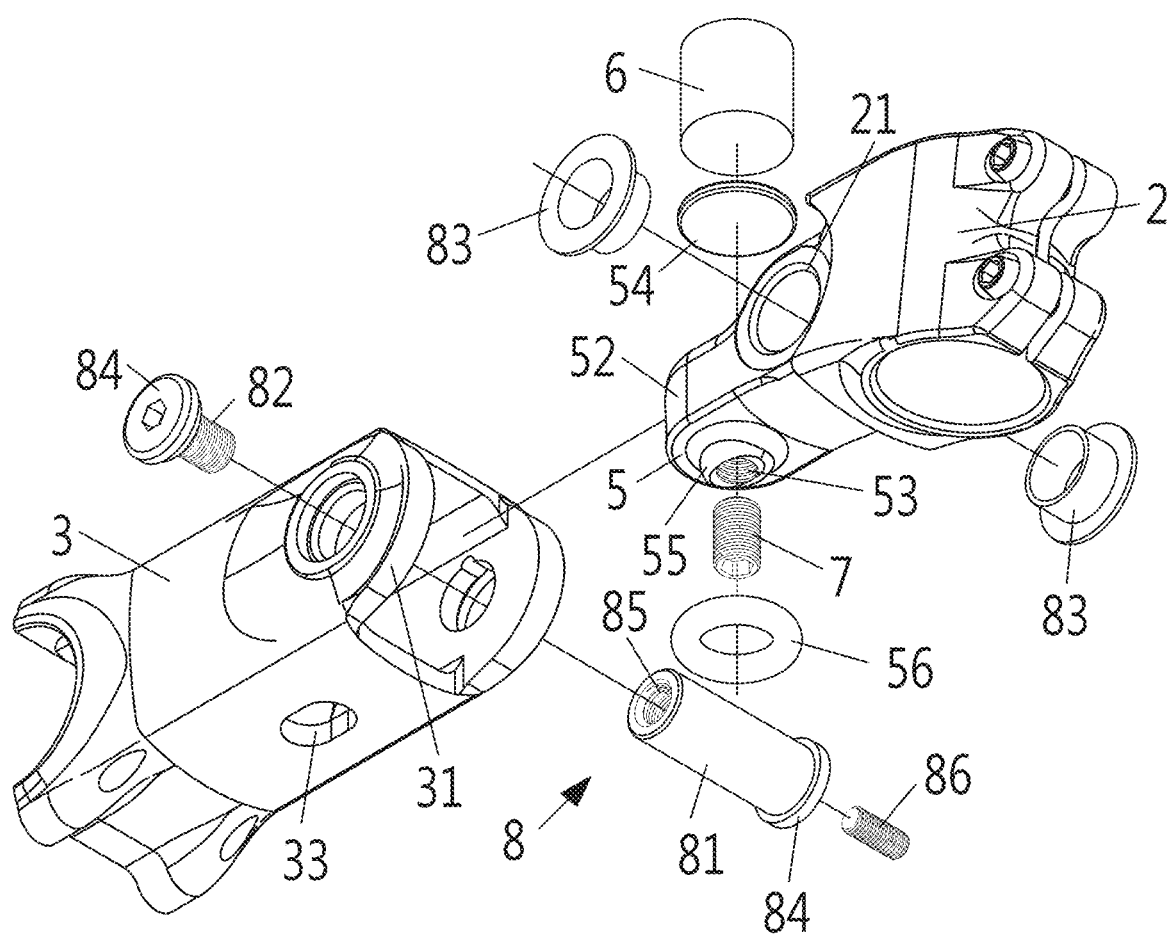
FIG. 2 is an exploded structural diagram of the damping device according to the invention.

FIG. 1 is a perspective structural diagram of the damping device according to the invention, and FIG. 2 is an exploded structural diagram of the damping device according to the invention. As disclosed herein, a bicycle handlebar 1 is connected to a front fork tube 4 by a stem tube, while the stem tube comprises a stem seat 2 and a handlebar seat 3. The bottom of the front fork tube 4 is adapted for connection to a front wheel (not shown) of the bicycle. The stem seat 2 is integrally provided with a pair of pivot portions 21 and a sleeve portion 22. The sleeve portion 22 is adapted for being sleeved on top of the front fork tube 41. The handlebar seat 3 is integrally provided with a lug clip portion 31 and a socket portion 32. The socket portion 32 is adapted for being sleeved to the handlebar 1 of the bicycle, while the pair of lug clip portions 31 are pivotally connected to the pivotal portion 21 by a pivot assembly 8, thereby forming a connection between the handlebar 1 and the front fork tube 4.

The damping device disclosed herein comprises at least one pressing member 5, at least one shock absorption member 6 and an adjustment member 7.

The pressing member 5 is integrated with and extends from the pivot portion 21 of the stem seat towards the handlebar 1. An accommodation room 51 is defined between the pressing member 5 and the main body of the handlebar seat 3. The shock absorption member 6 is disposed in the accommodation room 51, while the upper and lower sides of the shock absorption member 6 are arranged in contact with either the pressing member 5 or the main body of the handlebar seat 3. The adjustment member 7 extends through the main body of the handlebar seat 3 into the pressing member 5, thereby contacting the shock absorption member 6.

Figure 3:
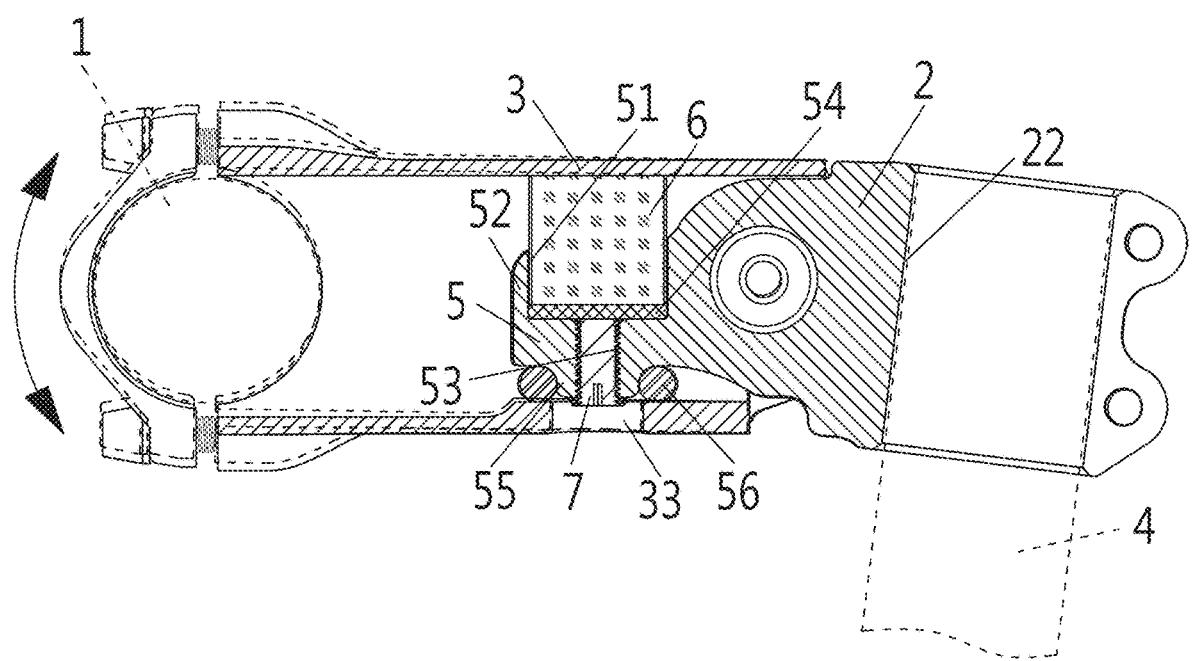
FIG. 3 is a schematic structural diagram of the damping device according to the invention.

Referring to the embodiment shown in FIG. 3, the pressing member 5 is positioned under the shock absorption member 6, and the shock absorption member 6 abuts against the main body of the handlebar seat 3. A surrounding wall 52 extends from the circumference of the pressing member 5 towards the main body of the handlebar seat 3 to surround the lateral side of the shock absorption member 6, so that the shock absorption member 6 is firmly secured within the accommodation room 51. The pressing member 5 is formed with a through hole 53 through which the adjustment member 7 is inserted. The through hole 53 is provided with internal threads, and the adjustment member 7 is provided with external threads for engaging the internal threads. By virtue of the thread engagement, the relative position of the adjustment member 7 within the through hole 53 can be adjusted. The main body of the handlebar seat 3 is formed with a perforation 33 which may be arranged to register with the through hole 53, thereby exposing the head of the adjustment member 7 for the user to make adjustment. In addition, a gasket 54 may be disposed between the pressing member 5 and the shock absorption member 6.

When a rider is riding a bicycle to an unevenness road, causing the bicycle to shake, the handlebar seat 3 will be shaken as the front fork tube 4 sleeved within the sleeve portion 22 of the stem seat 2 vibrates up and down. At this time, the pressing portion 5 will press against the shock absorption member 6, allowing the shock absorption member 6 absorbs the vibration of the front fork tube 4 to reduce the intensity of shaking of the handlebar seat 3, and the handlebar 1 sleeved on the handlebar seat 3 will not generate vibration or only generate slight shock, effectively reducing the discomfort caused by the bicycle vibration. Moreover, a user may use a hand tool to adjust the relative position of the adjustment member 7 within the through hole 53 through the perforation 33, so that the degree that the shock absorption member 6 is by the gasket 54 may be adjusted, whereby the strain rate of the shock absorption member 6 may be adjusted to achieve various degrees of shock absorption effects.

In addition, the pressing member 5 is formed with an annular flange 55 extending towards the perforation 33 and surrounding the through hole 53. A shock absorber 56 is sleeved upon the annular flange 55, so that the upper and lower sides of the shock absorber 56 are arranged in contact with the pressing member 5 or the main body of the handlebar seat 3. By virtue of allowing the pressing member 5 to press against the shock absorber 56, the shock absorber 56 is adapted to absorb the vibrational force. In this embodiment, the shock absorption member or the shock absorber may be made of elastic material, such as plastics and rubbers.

Figure 4:
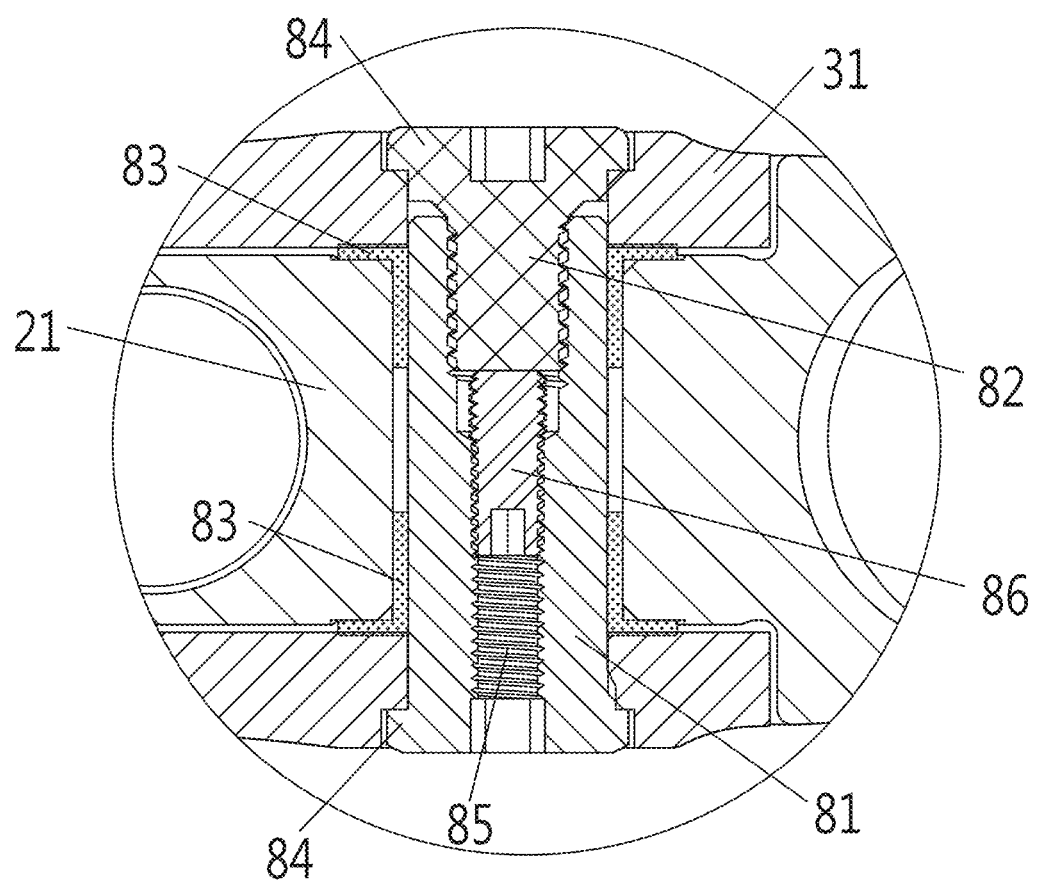
FIG. 4 is an enlarged schematic structural diagram of the damping device according to the invention viewed from another angle.

Referring to FIG. 2 and FIG. 4, the pivot assembly 8 comprises a first and a second fastener members 81, 82 engaged with each other and two gaskets 83. The first and second fastener members 81, 82 are each formed at their outer ends with a cover plate 84 which is configured to be complementary in shape with the lug clip portion 31. The first fastener member 81 is formed with a bolt hole 85 extending throughout the entire length of the first fastener member 81 and adapted to receive the second fastener member 82. An adjustment part 86 is screwed into the bolt hole 85 through the cover plate 84 of the first fastener member 81. The two gaskets 83 are fitted between the lug clip portions 31 and the pivot portion 21 and sleeved upon the first fastener member 81. The depth of the second fastener member 82 inserted into the bolt hole 85 can be adjusted by adjusting the depth of the adjustment part 86 inserted in the bolt hole 85, so that the tightness of the pivot joint between the stem seat 2 and the handlebar seat 3 is adjusted. According to the embodiment shown in FIG. 4, the threads formed in the bolt hole 85 of the first fastener member 81 may comprise two thread sections for engaging the second fastener member 82 and the adjustment part 86, respectively. It is apparent that a single thread section formed in the bolt hole 85 in the first fastener member 81 is also workable for tightening the second fastener member 82 and the adjustment part 86.

In summary, this invention provides a better and more feasible bicycle handlebar damping device. While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention

I claim:

1. A bicycle handlebar damping device, where the bicycle handlebar is connected to a front fork tube by a stem tube comprising a stem seat and a handlebar seat, and the handlebar seat is provided with a pair of lug clip portions pivoted on a pivot portion of the stem seat by a pivot assembly, the damping device comprising:
- at least one pressing member integrated with and extending from the pivot portion of the stem seat towards the handlebar, wherein an accommodation room is defined between the pressing member and a main body of the handlebar seat;
- at least one shock absorption member disposed in the accommodation room and arranged in contact with the pressing member and the main body of the handlebar seat; and
- an adjustment member extending through the main body of the handlebar seat into the at least one pressing member, thereby contacting the at least one shock absorption member.

2. The device according to claim 1, further comprising a gasket disposed between the at least one pressing member and the at least one shock absorption member.

3. The device according to claim 2, wherein the pressing member is formed with a through hole through which the adjustment member is inserted.

4. The device according to claim 3, wherein the through hole is provided with internal threads, and the adjustment member is provided with external threads for engaging the internal threads.

5. The device according to claim 1, wherein the main body of the handlebar seat is formed with a perforation, thereby exposing a head of the adjustment member.

6. The device according to claim 5, wherein the pressing member is formed with an annular flange extending towards the perforation, and a shock absorber is sleeved upon the annular flange, so that the shock absorber abuts against the pressing member and the main body of the handlebar seat.

7. The device according to claim 6, wherein the shock absorber is made of elastic material.

8. The device according to claim 6, wherein the at least one shock absorption member includes an upper side in contact with the main body of the handlebar seat and a lower side in contact with the at least one pressing member, whereas the shock absorber includes an upper side in contact with the at least one pressing member and a lower side in contact with the main body of the handlebar seat.

9. The device according to claim 8, wherein a surrounding wall extends from circumference of the pressing member towards the main body of the handlebar seat to surround lateral sides of the shock absorption member.

10. The device according to claim 1, wherein the shock absorption member is made of elastic material.

11. The device according to claim 1, wherein the pivot assembly comprises a first and a second fastener members engaged with each other, each of them being formed at its outer end with a cover plate configured to be complementary in shape with one of the lug clip portions, and wherein the first fastener member is formed with a bolt hole extending throughout an entire length of the first fastener member and adapted to receive the second fastener member, and an adjustment part is screwed into the bolt hole through the cover plate of the first fastener member.

12. The device according to claim 11, wherein the pivot assembly further comprises two gaskets fitted between the lug clip portions and the pivot portion and sleeved upon the first fastener member.

* * * * *